United States Patent
Dobusch

(10) Patent No.: US 8,749,941 B2
(45) Date of Patent: Jun. 10, 2014

(54) RESIDUAL-CURRENT CIRCUIT BREAKER

(75) Inventor: Gerhard Dobusch, Vienna (AT)

(73) Assignee: Moeller Gebäudeautomation GmbH, Schrems (AT)

(*) Notice: Subject to any disclaimer, the term of this patent is extended or adjusted under 35 U.S.C. 154(b) by 201 days.

(21) Appl. No.: 13/051,444

(22) Filed: Mar. 18, 2011

(65) Prior Publication Data

US 2012/0069484 A1 Mar. 22, 2012

Related U.S. Application Data

(60) Provisional application No. 61/315,505, filed on Mar. 19, 2010.

(30) Foreign Application Priority Data

Mar. 19, 2010 (AT) .................................. A 450/2010

(51) Int. Cl.
    *H01H 73/02* (2006.01)
(52) U.S. Cl.
    USPC ............................................ 361/115; 335/18
(58) Field of Classification Search
    USPC ............................................ 361/115; 335/18
    See application file for complete search history.

(56) References Cited

U.S. PATENT DOCUMENTS

| | | | |
|---|---|---|---|
| 7,518,256 B2 * | 4/2009 | Juanarena Saragueta et al. | 290/44 |
| 2002/0180444 A1 * | 12/2002 | Bauer | 324/424 |
| 2010/0191306 A1 * | 7/2010 | Stevenson et al. | 607/45 |

FOREIGN PATENT DOCUMENTS

| | | |
|---|---|---|
| DE | 91 16 917.8 | 9/1994 |
| DE | 44 39 072 C2 | 5/1996 |
| EP | 0 106 045 | 1/1987 |
| EP | 0 524 142 B1 | 1/1993 |
| GB | 2 238 921 A | 6/1991 |
| JP | 11339629 A | 12/1999 |
| WO | WO 01/82441 A1 | 11/2001 |
| WO | WO 2009/100470 | 8/2009 |

\* cited by examiner

*Primary Examiner* — Jared Fureman
*Assistant Examiner* — Nicholas Ieva
(74) *Attorney, Agent, or Firm* — Henry M Feiereisen LLC

(57) ABSTRACT

A residual-current circuit breaker includes at least one summation current transformer through which are guided at least one first conductor and one second conductor of an electric network to be protected. At least one secondary winding is arranged on the summation current transformer and connected in terms of circuitry to a trip element. A test circuit connects the first conductor with the second conductor and includes at least one first test resistor, a second test resistor arranged serially in relation to the first test resistor in terms of circuitry, and a test button. The second test resistor is bridged by a shunt line which is guided through the summation current transformer. Arranged in the shunt line in terms of circuitry is at least one first voltage-dependent resistor.

9 Claims, 2 Drawing Sheets

RESIDUAL-CURRENT CIRCUIT BREAKER

CROSS-REFERENCES TO RELATED APPLICATIONS

This application claims the benefit of prior filed U.S. provisional Application No. 61/315,505, filed Mar. 19, 2010, pursuant to 35 U.S.C. 119(e), the content of which is incorporated herein by reference in its entirety as if fully set forth herein.

This application also claims the priority of Austrian Patent Application, Serial No. A 450/2010, filed Mar. 19, 2010, pursuant to 35 U.S.C. 119(a)-(d), the content of which is incorporated herein by reference in its entirety as if fully set forth herein.

BACKGROUND OF THE INVENTION

The present invention relates to a residual-current circuit breaker.

The following discussion of related art is provided to assist the reader in understanding the advantages of the invention, and is not to be construed as an admission that this related art is prior art to this invention.

Residual-current circuit breakers are provided for the protection of living beings and installations from hazardous fault currents and according to relevant international, national and regional regulations must trip upon the occurrence of a fault current which lies between half the rated fault current and the rated fault current.

In accordance with relevant international, national and regional regulations, residual-current circuit breakers must further include a testing device for testing the proper function of fault current tripping. Such a testing device usually has a test resistor and a test button, with a test current circuit being closed upon actuating the test button and, in this way, a simulated fault current being generated from one conductor to another conductor past a summation current transformer. If the residual-current circuit breaker works correctly, it is tripped and the break contacts of the residual-current circuit breaker will disconnect the conductor of a network to be protected.

In accordance with the regulations, the linkage in the summation current transformer caused by the actuation of the testing device must be smaller than 2.5 times the linkage generated by the rated fault current. In accordance with regulations, up to 75 mA are allowed to flow in the rated voltage in a residual-current circuit breaker with a rated fault current of 30 mA. A residual-current circuit breaker that trips upon actuation will therefore not necessarily trip securely even on the occurrence of a substantially lower actual full current.

The test circuit must further reliably work over a wide range of supply voltages. The test circuit must still work at supply voltages of 85% of the rated voltage, and under the usual fluctuations of the supply or network voltage of 10%. Furthermore, there are four-pole residual-current circuit breakers which may also be used as two-pole residual-current circuit breakers. This means that the simulated fault current is increased by 225% in the maximum permissible supply voltage in a test circuit which is dimensioned in such a way that the fault current simulated by the same corresponds to the rated fault current at 85% of the rated voltage. A residual-current circuit breaker which is considered to be functionally reliable at such a high simulated fault current therefore possibly presents a hazard to living beings and installations because it is not possible to securely conclude the function of the residual-current circuit breaker at the rated fault current.

It would therefore be desirable and advantageous to provide an improved residual-current circuit breaker which obviates prior art shortcomings and with which a functionality of fault current tripping can be verified more precisely in a simple and reliable manner.

SUMMARY OF THE INVENTION

According to one aspect of the present invention, a residual-current circuit breaker includes at least one summation current transformer through which are guided at least one first conductor and one second conductor of an electric network to be protected, at least one secondary winding arranged on the summation current transformer, a trip element connected with the at least one secondary winding in terms of circuitry, a test circuit connecting the first conductor with the second conductor and including at least one first test resistor, a second test resistor arranged serially in relation to the first test resistor in terms of circuitry, and a test button, a shunt line bridging the second test resistor and guided through the summation current transformer, and at least one first voltage-dependent resistor arranged in the shunt line in terms of circuitry.

A residual-current circuit breaker in accordance with the invention renders possible a verification of the functionality of fault current tripping more precisely than before. It can thus be achieved that the simulated fault current produced by actuation of the test button will fluctuate merely in a range of approximately 10% depending on the supply voltage actually applied to the residual-current circuit breaker, which is in contrast to the fluctuations of over 200% according to the afore-described state of the art. It is therefore possible to conclude after a successful test of the residual-current circuit breaker that the respective residual-current circuit breaker will actually work in the case of an occurring fault and will actually trip. Defective residual-current circuit breakers can thus be recognized as such and can be exchanged. The safety of living beings and installations can thus be increased considerably.

A residual-current circuit breaker in accordance with the invention further has a very simple configuration. As a result, the advantageous effects as mentioned above can be implemented very simply and will cause only very low additional costs. This means that the propagation of the present invention can thus be promoted, thereby increasing the security of a large number of electric installations. The simple configuration allows arranging the test circuit completely independently of network voltage, as a result of which it is very failsafe and can therefore be used in all countries in the world.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
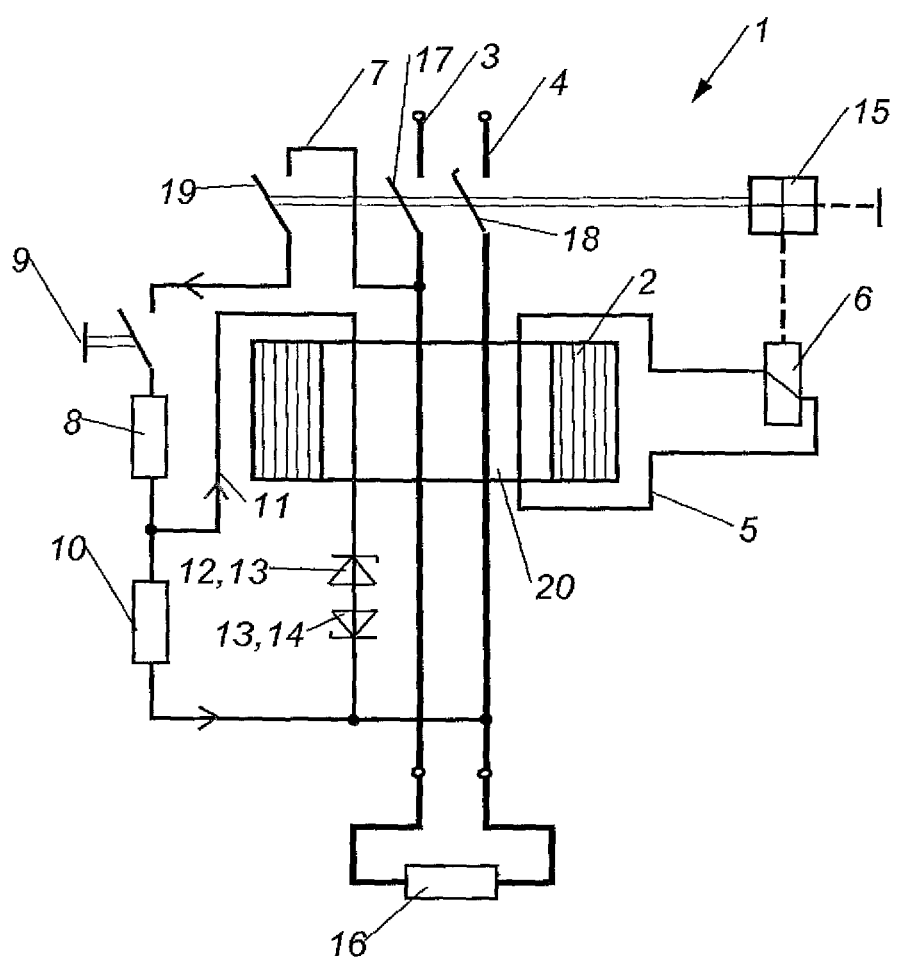
FIG. 1 is a schematic circuit diagram of one embodiment of a residual-current circuit breaker in accordance with the invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 2:
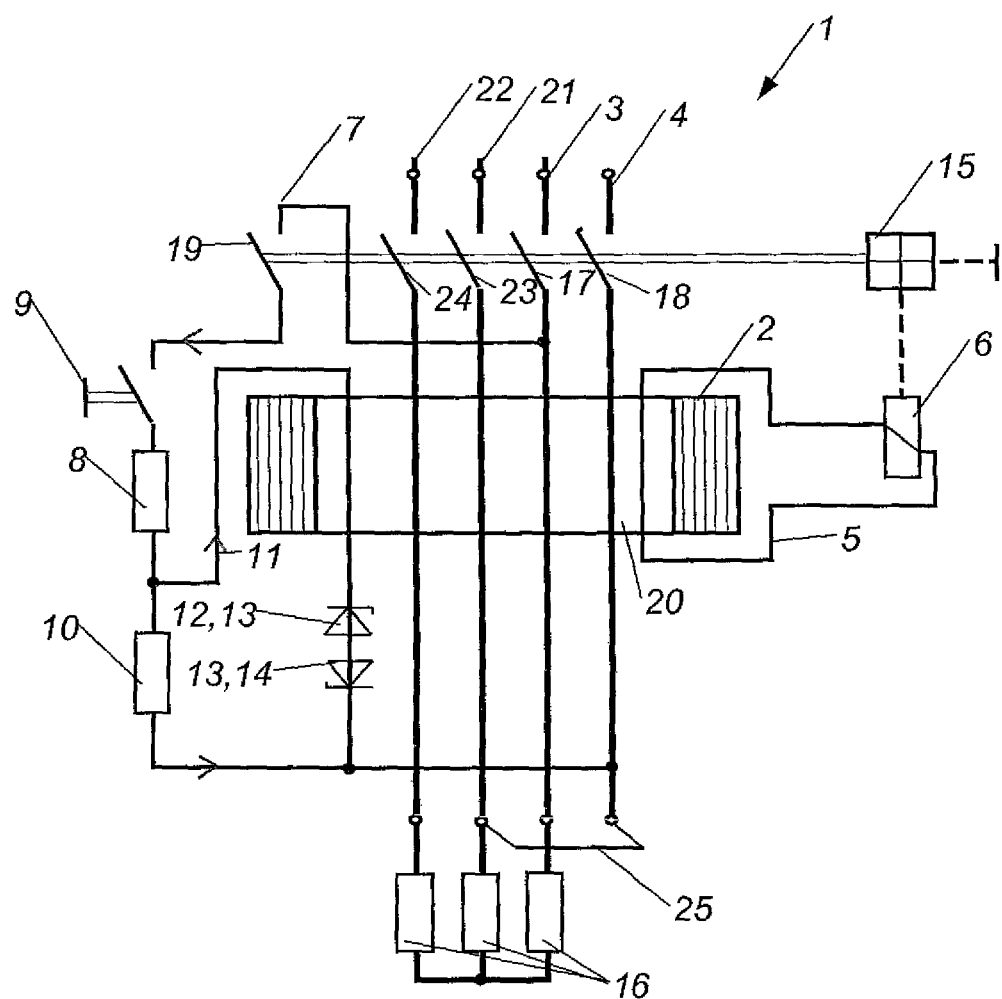
FIG. 2 is a schematic circuit diagram of another embodiment of a residual-current circuit breaker in accordance with the invention.

FIGS. 1 and 2 show a schematic circuit diagram of two embodiments of a residual-current circuit breaker in accordance with the invention, generally designated by reference numeral 1. The residual-current circuit breaker 1 includes at least one summation current transformer 2 through which at least a first conductor 3 and a second conductor 4 of a network to be protected are guided, with at least one secondary winding 5 being arranged on the summation current transformer 2. The secondary winding 5 is connected to a trip element 6 in terms of circuitry, with the first conductor 3 being connected to the second conductor 4 by a test circuit 7 which includes at least one first test resistor 8 and a test button 9. The test circuit 7 has a second test resistor 10 which is arranged serially in relation to the first test resistor 8 in terms of circuitry, with the second test resistor 10 being bridged by a shunt line 11 which is guided through the summation current transformer 2. At least one first voltage-dependent resistor 12 is arranged in terms of circuitry in the shunt line 11.

As a result, the functionality of fault current tripping of a residual-current circuit breaker 1 in accordance with the invention can be checked more precisely than before. It can thus be achieved that the simulated fault current generated upon actuation of the test button 9 will fluctuate merely in a range of approximately 10% depending on the supply voltage actually applied to the residual-current circuit breaker 1, as opposed to fluctuations of over 200% in the afore-mentioned state of art. It can thus be concluded after a successful test of the residual-current circuit breaker 1 that the respective residual-current circuit breaker 1 will work in case of an actually occurring fault and will actually trip. Defective residual-current circuit breakers 1 can thus be recognized and exchanged. The safety of living beings and installations can thus be increased considerably.

A residual-current circuit breaker 1 in accordance with the invention further has a very simple configuration. As a result, the advantageous effects as mentioned above can be implemented very simply and will cause only very low additional costs. This promotes proliferation of the present invention, thereby increasing the security of a large number of electric installations. The simple configuration allows arranging the test circuit completely independently of network voltage, as a result of which it is very failsafe and can further be used in all countries in the world.

The residual-current circuit breaker 1 in accordance with the invention may involve any kind of residual-current circuit breaker 1, which can especially include further functionalities and modules apart from the ones described in the present invention. As is shown in FIGS. 1 and 2, the residual-current circuit breaker 1 in accordance with the invention is especially provided for use in an electric network with two or four conductors 3, 4, 21, 22. Embodiments can be provided however with any predeterminable number of lines or conductors of an electric power supply network or power distribution network.

The residual-current circuit breaker 1 includes in a manner known per se at least one summation current transformer 2 with a transformer core having a magnetic material, through which at least the first and second conductors 3, 4 are guided as a primary winding. In the description, the expression "guided through the summation current transformer" relates to the usual arrangement of the summation current transformer with an annular transformer core which has an opening through which the respective conductors 3, 4, 21, 22 are guided. These conductors 3, 4, 21, 22 are advantageously further guided or wound at least once around the cross-section of this "ring".

A secondary winding 5 for detecting a fault current signal is further arranged on the summation current transformer 2 which is advantageously formed by a conductor such as a thin wire which is wound several times around the cross-section of the "ring". The secondary winding 5 is connected in terms of circuitry indirectly with a trip element 6, by means of which an especially secure and rapid response of the residual-current circuit breaker 1 can be achieved. The trip element 6 acts mechanically via a breaker mechanism 15 on the break contacts, which is illustrated in FIGS. 1 and 2 by the dotted line. A respective fault current signal is generated in the secondary winding 5 upon occurrence of a hazardous fault current, and the trip element 6 acts upon the break contacts 17, 18, 19, 23, 24 which are opened, and break the first and second conductors 3, 4 and optionally the third and fourth conductors 21, 22. It is also possible to provide configurations of a trip element 6 which deviate therefrom, e.g. a trip element which is dependent on mains voltage.

A residual-current circuit breaker 1 in accordance with the invention further includes a test circuit 7 which is provided and arranged to generate a simulated fault current. The test circuit 7 connects the first conductor 3 with the second conductor 4, with the connecting line not being guided through the summation current transformer 2 but "outside" past the same. The test circuit 7 is not closed in normal operation of the residual-current circuit breaker 1, which means that no current flows in this test circuit 7. A test button 9 is provided for closing the test circuit 7.

The test circuit 7 further includes at least one first test resistor 8. A resistor is designated as a test resistor 8 within the scope of the present invention which substantially acts as an ohmic resistor, or at least acts as purely ohmic resistor in the frequency of the network to be protected.

The test circuit 7 further includes a so-called fifth break contact 19, as shown in FIGS. 1 and 2. The fifth break contact 19 is mechanically connected with the breaker mechanism 15 or the further break contacts 17, 18, 23, 24 and is also opened during the opening of the first, second, third and fourth break contacts 17, 18, 23, 24. This prevents that current continues to flow via the test circuit 7 and the test resistor 8 upon actuation of the test button 9 and the already occurred tripping of the residual-current circuit breaker 1. Such a current that continues to flow would lead to considerable power losses in the test resistor 8 which could lead to the thermal destruction of the test resistor(s) 8, 10. This can reliably be prevented by the fifth break contact 19, and the first test resistor 8 and the second test resistor 10 can be chosen at a low value concerning its permissible power loss.

The test circuit 7 has a second test resistor 10 which is advantageously also constructed as an ohmic resistor. The second test resistor 10 is arranged in terms of circuitry in a serial manner in the test circuit 7 in relation to the first test resistor 8 and is bridged by a shunt line 11. The shunt line 11 is guided through the summation current transformer 2 and therefore through the opening of an annularly configured summation current transformer 2. At least one voltage-dependent resistor 12 is arranged in the shunt line 11 in terms of circuitry.

The voltage-dependent resistor 12 may involve any kind of resistor which has a high, especially very high, resistance at an applied voltage beneath a specific limit voltage and a very low resistance above this limit voltage. In practice, this limit voltage can also be configured as a limit voltage range with a certain transitional range of the resistance. Advantageously, the at least one first voltage-dependent resistor 12 is constructed as a varistor and/or suppressor diode and/or Zener diode 13. In relation to the at least one first voltage-dependent resistor 12 as a semiconductor component, the so-called limit voltage is also known as breakdown voltage. The afore-mentioned preferred components can have different characteristic properties such as current/voltage curves, breakdown voltages, voltage drops and the like. Depending on the situation at hand, one of the preferred components can be given precedence.

It can be achieved by the circuit arrangement in accordance with the invention that the shunt line remains highly resistant or substantially not conductive up until reaching the breakdown voltage. In this case the test circuit 7 works as is known, with the first and second test resistor 8, 10 acting like a single resistor. Once the voltage drop on the second test resistor 10 has reached or exceeded the breakdown voltage of the first voltage-dependent resistor 12, the first voltage-dependent resistor 12 will become low resistant and will form a parallel circuit to the second test resistor 10. Since the shunt line 11 is guided through the summation current transformer 2, a part of the simulated fault current which flows through the first test resistor 8 is guided back through the summation current transformer 2, which is why this partial current is not detected as a fault current. It can thus be achieved that the fault current actually detected by the secondary winding 5 will not rise further with rising voltage difference between the first and the second conductor 3, 4, but remains limited to a relatively constant value or range. As a result of the residual resistance, which the voltage-dependent resistor 12, 14 continues to have in its through-connected state or the voltage drop in the semiconductor junction layer, a part of the simulated fault current continues to flow through the second test resistor 10 and past the summation current transformer 2.

The size or level of the simulated fault current share can be predetermined via the size of the first and second test resistors 8, 10 and optionally the choice of the at least one first voltage-dependent resistor 12, which simulated fault current share flows via the second test resistor 10 and is actually available as a fault current for detection by the secondary winding 5. Advantageously, the first and second test resistors 8, 10 can be constructed such that the first test resistor 8 has a value of 15 k ohms and the second test resistor 10 has a value of 560 ohms. As an alternative, the first and second test resistors 8, 10 can be constructed such that the first test resistor 8 has a value of 4 k 7 ohms and the second test resistor 10 has a value of 1 k 5 ohms.

It can further be provided in a further development of the present invention that an additional resistor is arranged in terms of circuitry in the shunt line 11 serially in relation to the at least one first voltage-dependent resistor 12. This additional resistor is advantageously constructed as a conventional ohmic resistor. The voltage drop over the entire shunt line 11 can thus be increased and the simulated fault current flowing via the second test resistor 10 can further be influenced or set in a predeterminable manner.

As shown in FIGS. 1 and 2, a second voltage-dependent resistor 14 can be arranged serially in relation to the first voltage-dependent resistor 12 in the shunt line 11. The voltage drop via the shunt line 11 can further be influenced by such a second voltage-dependent resistor 14.

The second voltage-dependent resistor 14 further offers the possibility of arranging the respective residual-current circuit breaker 1 to be suitable for alternating voltage in the case of unipolar components, e.g. the arrangement of the first voltage-dependent resistor 12 as a Zener diode. It is therefore further provided in this connection that the second voltage-dependent resistor 14 is constructed as a Zener diode 13. Advantageously, the first voltage-dependent resistor 12 which is constructed as a Zener diode 13 is arranged in the shunt line 11 in terms of circuitry with a polarity that is opposite to the second voltage-dependent resistor 14.

The first and second preferred embodiment of the present invention will be described below in detail by reference to FIGS. 1 and 2.

The functional modules of the residual-current circuit breaker 1 for fault current tripping which is independent of mains voltage are shown in FIG. 1 only schematically. Such a residual-current circuit breaker 1 is provided for the protection of installations and humans, with the consumer or load 16 being disconnected from a supply network comprised of the first conductor 3 and second conductor 4 in the event of an occurring hazardous fault current. The residual-current circuit breaker 1 has terminals, especially screw-type terminals, for the connection of at least one first and one second conductor 3, 4 of an electric supply network. The illustrated schematic circuit diagram according to FIG. 1 shows an embodiment with merely a first and a second conductor 3, 4. First and second break contacts 17, 18, and therefore switching contacts, are arranged in the first and second conductors 3, 4. They are provided for breaking or disconnecting the first and second conductors 3, 4 and for the subsequent closing of the same. The described components or modules as shown in FIG. 1 are jointly arranged in a housing made of an insulating material which has breakthroughs at least for the terminals and a hand lever that can be actuated manually for opening and closing the first and second break contacts 17, 18. The residual-current circuit breaker 1 includes further components or modules which are not illustrated and described and which are a switch position indicating device, a trip display and the like. FIG. 1 further shows a load 16 by way of example, as an electric consumer.

The residual-current circuit breaker 1 is advantageously constructed as a residual-current circuit breaker 1 which is independent of mains voltage. The modules which are arranged in such a residual-current circuit breaker 1 which is independent of mains voltage for the detection of a fault current and for tripping the residual-current circuit breaker 1 and therefore for disconnecting the break contacts 17, 18 obtain their power required for tripping completely from the fault current or the fault current signal proportional to the same in the secondary winding 5, and therefore do not have any active electronic components such as transistors and/or op-amps and no power units for supplying such active components.

The test circuit 7 is connected with the first conductor 3 and extends up to the fifth break contact 19 which is connected in a conductive manner with the test button 9. The test button 9 is further conductively connected with the first test resistor 8 whose other connection is conductively connected both with the second test resistor 10 and the shunt line 11. The further connection of the second test resistor 10 is conductively connected with the second conductor 4 and also with the shunt line 11. First and second voltage-dependent resistors 12, 14 are arranged in the shunt line 11 and constructed as Zener diodes 13. The respective Zener diodes 13 are arranged with opposite polarity in the shunt line 11.

FIG. 2 shows a second embodiment of a residual-current circuit breaker 1 in accordance with the invention which differs from the first embodiment as shown in FIG. 1 by the provision of third and fourth conductors 21, 22 which are associated with the third and fourth break contacts 23, 24. The second and third conductor 4, 21 are conductively connected on the load side of the summation current transformer 2 by means of a bridge 25. The further configuration of the residual-current circuit breaker corresponds to FIG. 1.

Further embodiments in accordance with the invention merely have a part of the described features. Any combination of features can be provided, especially also such of different described embodiments.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A residual-current circuit breaker, comprising:
   at least one summation current transformer through which are guided at least one first conductor and one second conductor of an electric network to be protected;
   at least one secondary winding arranged on the summation current transformer;
   a trip element connected with the at least one secondary winding in terms of circuitry;
   a test circuit connecting the first conductor with the second conductor and including at least one first test resistor, a second test resistor arranged serially in relation to the first test resistor in terms of circuitry, and a test button;
   a shunt line bridging the second test resistor and guided through the summation current transformer; and
   at least one first voltage-dependent resistor arranged in series with the shunt line.

2. The residual-current circuit breaker of claim 1, wherein the first voltage-dependent resistor is constructed as a varistor.

3. The residual-current circuit breaker of claim 1, wherein the first voltage-dependent resistor is constructed as a suppressor diode.

4. The residual-current circuit breaker of claim 1, wherein the first voltage-dependent resistor is constructed as a Zener diode.

5. The residual-current circuit breaker of claim 1, further comprising a second voltage-dependent resistor arranged serially in relation to the first voltage-dependent resistor in the shunt line.

6. The residual-current circuit breaker of claim 5, wherein the second voltage-dependent resistor is constructed as a Zener diode.

7. The residual-current circuit breaker of claim 6, wherein the first voltage-dependent resistor is constructed as a Zener diode and arranged in the shunt line in terms of circuitry with a polarity which is opposite of the second voltage-dependent resistor.

8. The residual-current circuit breaker of claim 1, further comprising an additional resistor arranged in terms of circuitry in the shunt line serially in relation to the at least one first voltage-dependent resistor.

9. The residual-current circuit breaker of claim 1, constructed to operate independent of a mains voltage.

* * * * *